United States Patent [19]
Raleigh et al.

[11] Patent Number: 5,130,523
[45] Date of Patent: Jul. 14, 1992

[54] COORDINATE MEASURING MACHINE WITH IMPROVED FLEXURE AND CLAMP FOR FIBER OPTIC CONNECTION

[76] Inventors: Freddie L. Raleigh, 81 E. Ridgeway Ave.; Frederick K. Bell, 1630 Ambridge Rd., both of Centerville, Ohio 45459

[21] Appl. No.: 688,223

[22] Filed: Apr. 22, 1991

[51] Int. Cl.$^5$ .................................................. G05B 1/00
[52] U.S. Cl. ....................................... 250/202; 33/1 M
[58] Field of Search ............... 250/202, 548; 33/1 M; 318/577; 356/345, 357, 358; 385/52

[56] References Cited

U.S. PATENT DOCUMENTS

| | | | |
|---|---|---|---|
| 4,432,601 | 2/1984 | Mannschke | 385/52 |
| 4,647,206 | 3/1987 | Kunzmann et al. | 356/385 |
| 4,888,878 | 12/1989 | Nagasawa et al. | 33/1 M |
| 4,991,309 | 2/1991 | Nagasawa et al. | 33/1 M |
| 5,031,333 | 7/1991 | Herzog et al. | 33/1 M |

*Primary Examiner*—David C. Nelms
*Assistant Examiner*—S. Allen
*Attorney, Agent, or Firm*—John R. Benefiel

[57] ABSTRACT

A coordinate measuring machine (10) having laser interferometers (80, 176, 196) arranged to measure "X" and "Y" carriage (52, 16) and probe shaft (56) motions, in which fiber optic cables (66, 72) are used to deliver a laser beam from a laser beam generator (60) to at least some of the interferometers (17). A special clamp (76) and adjustment flexure (74) is used to mount and align the fiber optics (66, 72) to beam splitters (64) dividing the laser beam from the laser generator (60) for use along each axis. The adjusting flexure (74) comprises a series of plate sections (120, 122, 124) interconnected with a pair of webs (142, 164) allowing tilting about two orthogonal axes with a pair of adjusting screws (148). A pair of locking straps (154) secure the plates (120, 122, 124) in the adjusted position. A double clamp (76) having axially spaced clamping jaws (102, 104) is connected to the flexure (74) and provides a stable securement of the optical coupling (96) to the flexure (74).

10 Claims, 7 Drawing Sheets

COORDINATE MEASURING MACHINE WITH IMPROVED FLEXURE AND CLAMP FOR FIBER OPTIC CONNECTION

This invention concerns a coordinate measuring machine (CMM) one for carrying out measurements on a workpiece supported on a table. The measurements are made by moving the tip of a probe between points of interest on the workpiece, and by measuring the displacement of the probe along each of three orthogonal axes (identified as the X, Y, and Z axes), the measurement can be made. In one common form of CMM the probe, is supported to be movable along a Z-axis, on an X-axis carriage, in turn supported on a Y-axis carriage, each carriage movable on corresponding ways and bearings for precisely guided movement along each axis, and means are employed to detect linear movement along each axis and generate corresponding electrical signals. A transducer in wide use involves detection of a Moire' fringe pattern generated by a slightly skewed grid moving along a grating fixed along an axis of movement, the pattern being detected by photocells which generate electrical output signals processed by suitable circuitry for display or further processing.

While the Moire' fringe transducer is very accurate and has been highly successful in this application, the need for even greater accuracy has led to the use of laser interferometers in CMM's. Laser interferometers involve the projection of a laser beam along each axis from an interferometer to a retroreflector target carried by structure relatively movable along each axis, and processing of the reflected beam in a receiver positioned to receive the same from the target. This arrangement generates more accurate measurements, but involves the need for a precisely aligned laser beam to be provided for each axis.

The prior practice has been to use a single laser beam generator mounted to the machine base, and by means of beam splitters and beam benders, direct a laser beam to the interferometer of each axis.

U.S. Pat. No. 4,261,107 issued on Apr. 14, 1981 for a "Coordinate Locating Device" describes a horizontal probe measuring device using laser interferometry in which beam benders and splitters are employed in this fashion.

This system necessitates a number of costly optical components, but more significantly creates critical alignment requirements which are axis interdependent. This requirement has reduced the reliability of CMM's using laser interferometers, and increased the maintenance requirements, since repeated movements along each axis is undergone by the relatively movable machine carriages and probe shaft, tending to degrade the alignment initially achieved during set up of the machine.

In copending U.S. application Ser. No. 07/688,753, filed on Apr. 19, 1991 for a "Coordinate Measuring Machine with Laser Interferometer and Fiber Optic Laser Delivery System", there is described and claimed a Coordinate Measuring Machine with a laser interferometer using a fiber optic network to transmit the beam from the generator to the various interferometers. The fiber optic cables need to be precisely and securely clamped and adjusted at the point of entry of the laser beam into the fiber optic. Conventional arrangements have not proven adequate for application to a coordinate measuring machine laser interferometer system, sufficiently reliable and secure adjustments not being able to be made.

SUMMARY OF THE INVENTION

The present invention comprises a clamp and adjustment flexure for a fiber optic connection in a coordinate measuring machine using a laser interferometer to measure displacements along each axis, in which a laser beam is delivered by a fiber optic laser delivery system to each interferometer from a laser generator.

The adjustment flexure comprises a stacked series of three plate sections, with the middle plate section joined along two sides to each outside plate section by a pair of orthogonal thin webs, allowing relative tilting of the outside plate sections along two orthogonal axes by respective adjusting screws. A pair of connecting straps are provided, one strap securely fixing each outside plate section and the middle plate section in respective pairs, when mounting screws are tightened down after the adjustments are carried out.

The clamp comprises a pair of connected but axially spaced clamping jaws secured to the flexure and, which grip the optical coupling at axially spaced locations to provide a stable mount of the optical coupling.

The fiber optic clamp and adjusting flexure has the advantage of allowing very precise adjustments which are very stably maintained such as to insure reliable operation with a minimum of maintenance.

DETAILED DESCRIPTION

Figure 1:
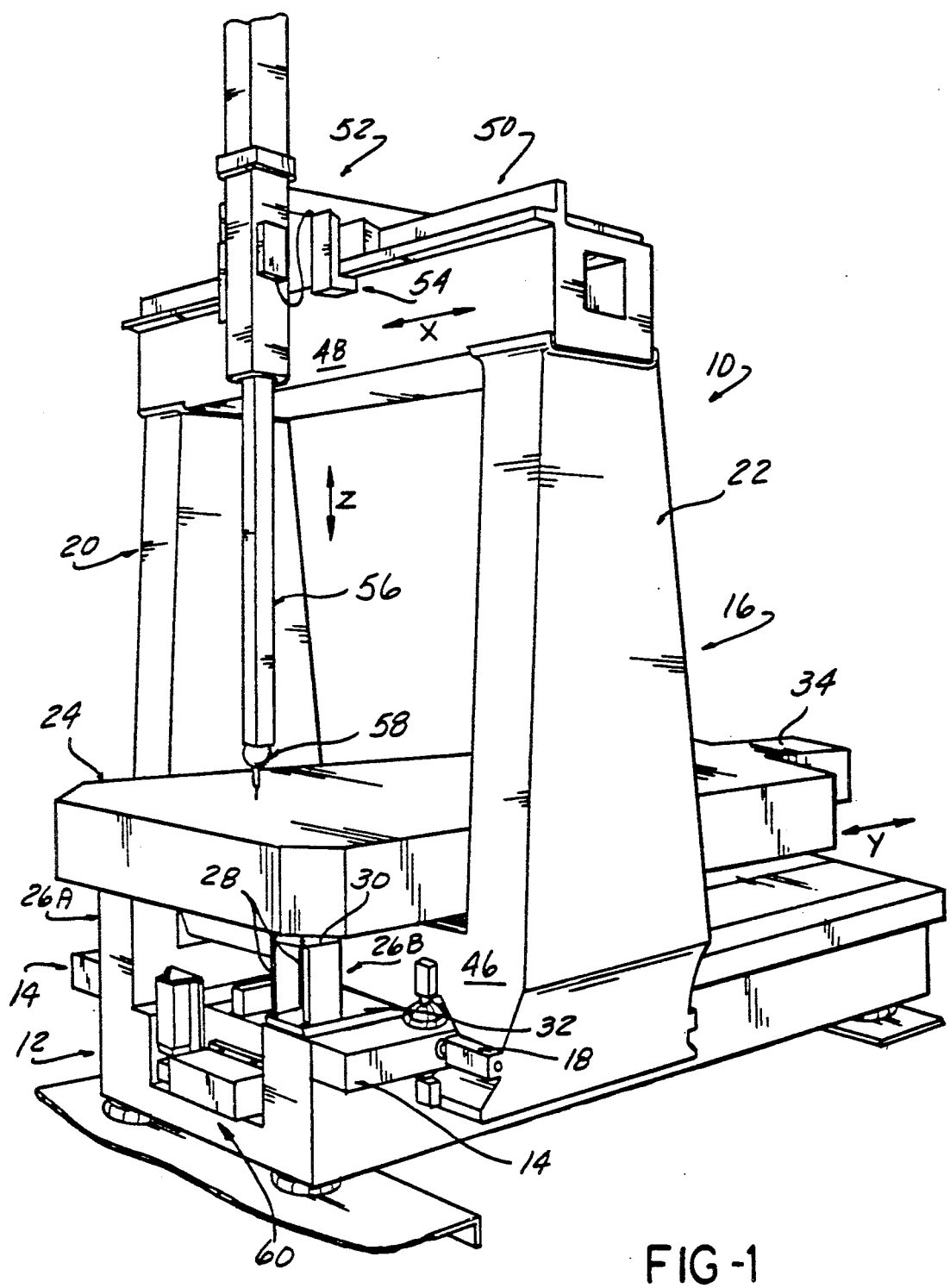
FIG. 1 is a perspective view of a coordinate measuring machine using a laser interferometer for each axis and a fiber optic laser delivery system according to a first embodiment of the invention.

FIG. 1 illustrates a coordinate measuring machine (CMM) 10 of a type having a base 12 formed with parallel ways 14 on which is supported a Y-axis carriage 16 by means of an air bearing array 18 on either side thereof. The base 12 is preferably supported on a suitable floor vibration isolator system. Such systems incorporate pneumatic isolators and viscous dampers, with a leveling servo valve controlled by a sensor finger associated with each isolator controlling air pressure in such a way as to maintain the height of each isolator. This avoids the effects of very heavy off center workpieces on the table position, and also tends to reduce excessive swaying caused by movements of the carriages when using very low frequency pneumatic isolators.

The Y-axis carriage 16 is supported and guided on the ways 14 for linear movement along the direction of the ways 14, this direction referred to as the Y-axis.

The Y-axis carriage 16 is of hollow construction, as of welded aluminum panels or a thin walled casting, and includes a pair of upright legs 20, 22 extending above the base 12 and a workpiece supporting table 24. The table 24, which may be of steel or granite to be able to support the weight of very heavy workpieces without excessive deflections, is supported spaced above the upper surface of the base 12 on a three point support.

A three point support of a table on the base and the base on the floor is preferable as described in U.S. Pat. No. 4,682,418 issued on Jul. 28, 1987 for a "Coordinate Measuring Machine".

The difference in thermal growth between an aluminum base and steel or granite table can cause distortions when temperature fluctuations occur, and hence a special mounting here is employed, as described in U.S. Pat. No. 4,682,418 to accommodate relative thermal growth. The support described therein comprises a first fixed support at the front, a second support at the front having a pin and slot connection allowing purely lateral movement in a single horizontal direction.

A third point of support at the rear is provided by a thrust bearing allowing movement in any horizontal direction.

This arrangement, while satisfactory in most situations, can lead to shifting of the table if there is excessive clearance in the pin and slot connection. Hence, in order to avoid the need for close tolerance machining, the machine shown in FIG. 1, a first fixed front support 26A is combined with a second front support 26B comprised of a pair of spaced apart webs 28 extending parallel to the length of the table 24 and the Y-axis. The webs 28 are joined at their tops and bottoms with plates 30, 32, secured to the table 24 and base 12 respectively. This creates a rigid connection in the direction of the Y-axis while allowing limited relative lateral movement to not necessitate a close tolerance pin and slot connection.

Figure 2:
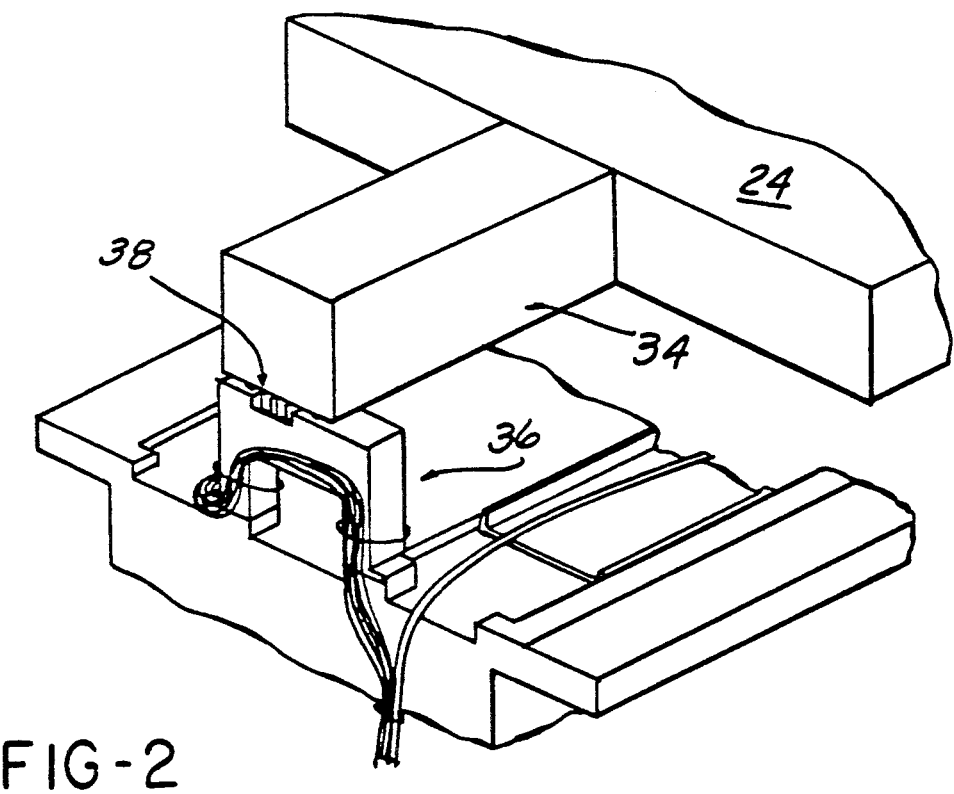
FIG. 2 is a fragmentary perspective rear view of the CMM shown in FIG. 1.
Figure 2A:
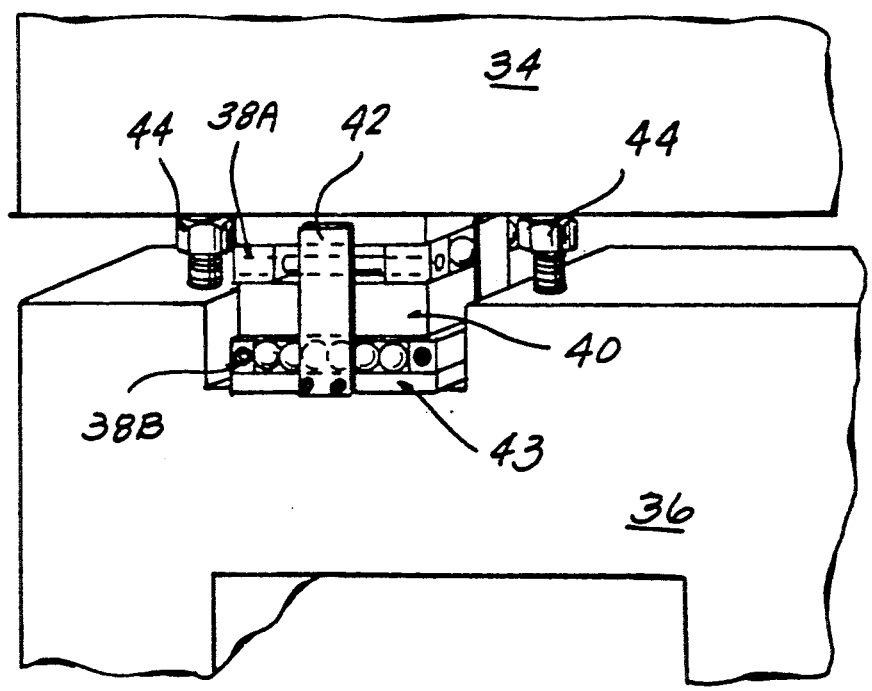
FIG. 2A is an enlarged perspective view of the rear table support bearing shown in FIG. 2.

FIG. 2 shows a table extension 34 at the rear of the table 24 is supported on a pedestal 36 and a cross roller bearing assembly 38.

FIG. 2B shows a pair of roller bearings 38A, 38B separated by a bearing plate 40. Roller bearing 38A is free to roll in the Y-axis direction and bearing 38B in the X-axis direction. Confinement straps 42 are attached to a lower bearing plate 42 to prevent the escape of either roller bearing 38A, 38B during assembly.

This bearing arrangement can support higher table loads than the prior arrangement and still allow lateral movement of the table due to thermal expansion.

Support studs 44 may be used to hold the weight of the table 24 and extension 34 during assembly.

The upright legs 20, 22 of the Y-axis carriage are connected at their lower ends by a cross beam 46 extending across the width of the base 12 in the intervening space between the underside of the table 24 and the upper surface of the base 12. This forms a so called "ring bridge" as described in U.S. Pat. No. 33,254 issued on Jul. 10, 1990 for a "Bridge Type Coordinate Measuring Machine".

The upper end of each of the legs 20, 22 are connected by an upper cross beam 48, formed with X-axis guide and support ways 50, on which is guided and supported an X-axis carriage 52 by air bearings 54, in the manner well known in the art and as described in the above cited U.S. Pat. No. 33,254.

The X-axis carriage 52 carries a probe shaft 56 guided therein as by air bearings (not shown) in the manner well known in the art. The weight of the probe shaft 56 may be supported by a counterbalance system, such as described in U.S. Pat. No. 4,799,316 issued on Jan. 24, 1989 for a "Coordinate Measuring Machine with a Probe Shaft Counter Balance System".

The Y-axis carriage 16, X-axis carriage 52, and probe shaft 56 may be manually moved along their respective axes, or, driven by servo drives (not shown) under joy stick or CNC control, as well known in the art, to move a probe tip 58 to successive points of interest on a workpiece supported on the upper surface of the table 24.

Each increment of movement of each of these structures along the X,Y, and Z axes is measured and electrical signals corresponding thereto to enable measurement of the workpiece. Heretofore, optical grids and photosensors have been employed, the principle described in U.S. Pat. Nos. 2,886,717 and 2,886,718 issued on May 12, 1959 for "Measuring Apparatus".

In an effort to improve accuracy, laser interferometers have been employed in CMM's, in which a laser beam is directed at a target on each movable structure, and a reflected beam is processed in laser transducing systems as described in U.S. Pat. No. 4,261,107 cited above.

Figure 3:
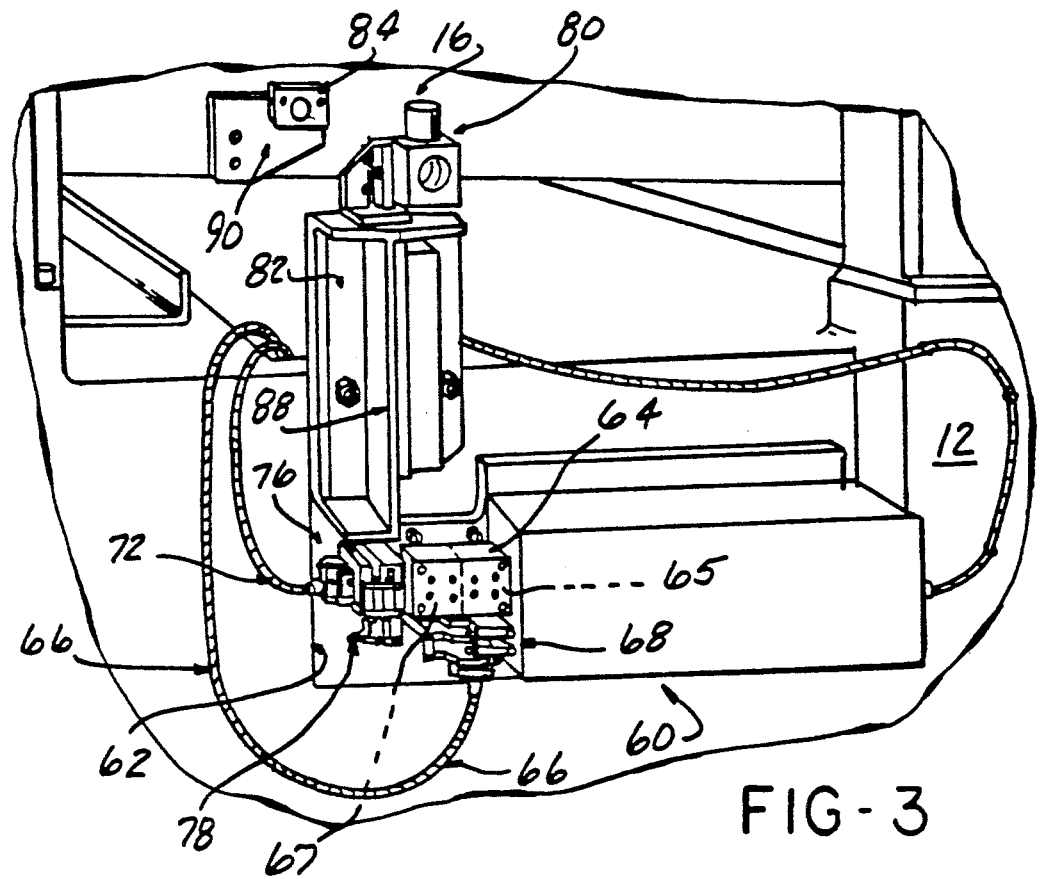
FIG. 3 is a front perspective view of the front of the CMM of FIG. 1, showing a laser generator, double beam splitter, and Y-axis interferometer.
Figure 3A:
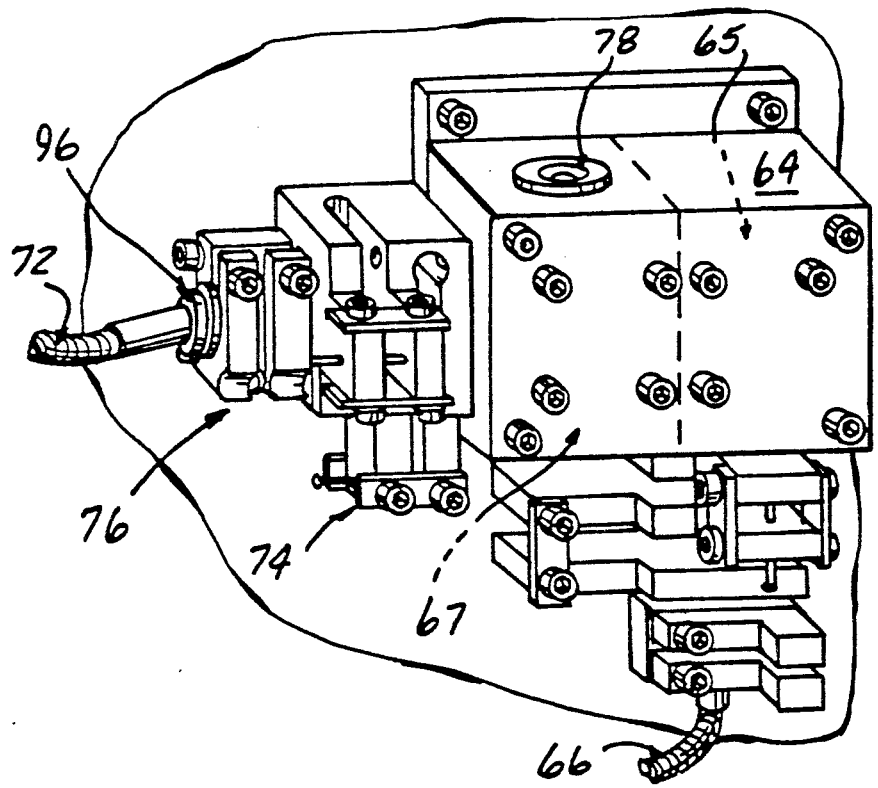
FIG. 3A is an enlarged perspective view of the components shown in FIG. 3.
Figure 4:
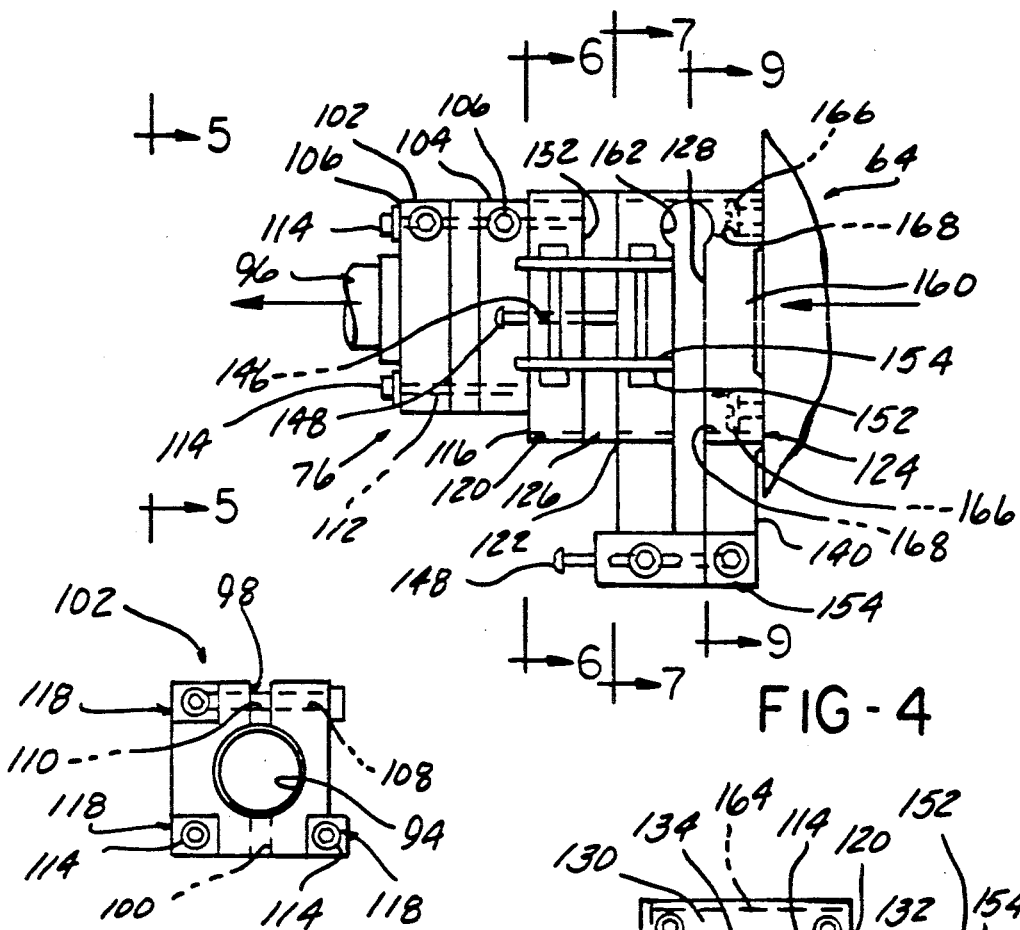
FIG. 4 is an enlarged view of one of the clamp adjustment flexure assemblies shown in FIG. 3.

A laser interferometer system is here employed, including a laser generator 60 mounted to the front of the base 12, as shown in further detail in FIG. 3, within a recessed space 62.

The laser generator is of a single frequency type (HeNe) commercially available, as from CMX Systems, Inc., of 130 Research Parkway, Meriden Conn., 06450.

Receiving the laser beam output from generator 60, is a double beam splitter contained in housing 64 mounted to the output end of the generator 60. The first 50 beam splitter 65 is of a 33% type in which one third of the beam is caused to be transmitted to a first optical cable 66, secured to housing 64 by means of a flexure 68 and clamp 70 according to the present invention, to be described hereinafter in detail.

A second beam splitter 67 in housing 64 is of the 50% type, receiving a two thirds proportion of the laser beam from the first beam splitter 65 and transmitting half of the beam to a second fiber optic cable 72 secured to housing 64 by an alignment adjustment flexure 74 and clamp 76. Suitable beam splitters 65 and 67 are commercially available, as from CMX, Systems, Inc.

The other 33% of the laser beam exits port 78 as is directed upwardly to a Y-axis interferometer 80 mounted atop a main bracket 82 secured to the base 12. An adjustment bracket 84 mounts the interferometer 80 to the bracket 82 so as to allow the exiting laser beam to be aligned with a target 86 mounted to the lower cross beam 46 of the Y-axis carriage 16.

The adjustment bracket 84 is described in detail in copending U.S. patent application Ser. No. 07/559,924 filed on Jul. 30, 1990 for a "Mounting Bracket Arrangement for Optical System Components".

A laser receiver optical phase decoder 88 is mounted to the main bracket 82, such receiver receiving a reflected signal from a reflector target 90 mounted on the Y-axis carriage 16. This arrangement is well known in the art, all of these components thereof commercially available as from CMX Systems, Inc.

FIGS. 4-7 show the details of the double clamp 76 and adjusting flexure 74 according to the present invention. The double clamp 76 is designed to provide a more stable securement than conventional single width clamps commonly used for this application.

The double clamp 76 is formed of a single rectangular piece having a bore 94 machined therein slightly oversize to the diameter of an optical coupling 96 included in the fiber optic cabling 72.

A fiber optic, armor cable and coupling assembly suitable for this purpose is commercially available as a laser delivery system assembly from York, Ltd. of York, U.K., and also through CMX Systems, Inc. referred to above.

A parallel slot 98 is machined into one side of the clamp 76, through to the bore 94 to create a collapsible jaw.

A transverse slot 100 is cut into the clamping piece in the middle of a side parallel to the bore 94 so as to create a pair of separated clamping jaws 102, 104.

Cap screws 106 are passed through a respective clearance hole 108 in each clamping jaw 102, 104 and received into a tapped hole 110 on the other side of the jaw 102 on the other side of the parallel slot 98.

Three mounting holes 112 extend through three corners of the clamping piece, receiving mounting screws 114 passing into the outside face 116 of the mounting adjustment flexure 74.

A relief is provided on the mating face of the clamp 76 except around the exit of each mounting hole 112 to create slightly raised bosses 118 so that the effect of slight unevenness in the mating faces is minimized.

The spaced clamping jaws 102 enables a secure, stable retention of the optical coupling 96, a critical requirement in the present application.

The adjustment flexure 74 comprises an integral piece of stainless steel divided into three parallel and aligned plate sections 120, 122, 124 by a pair of parallel slots 126, 128.

A bore 134 is machined entirely through each of aligned sections 120, 122, 124 to enable passage of the laser beam from the beam splitter 67 to the optical coupling 96.

Figure 5:
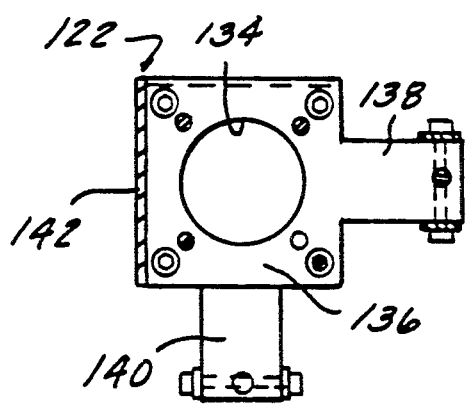
FIG. 5 is an end view of the clamp shown in FIG. 4 from the direction of the arrows 5—5.
Figure 6:
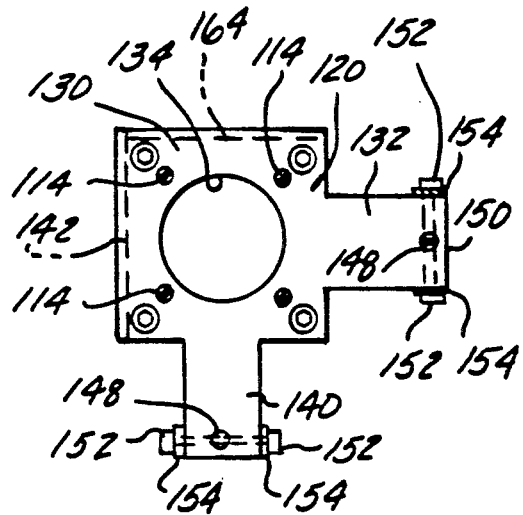
FIG. 6 is an end view of the adjustment flexure shown in FIG. 3 from the direction of the arrows 6—6.

FIG. 6 shows that the outer plate section 120 on the left side as viewed in FIG. 5 is very roughly tee shaped, having a square main portion 130 from which projects a narrowed portion 132.

Figure 7:
FIG. 7 is a sectional view through the adjustment flexure shown in FIG. 4 taken along the line 7—7.

FIG. 7 shows that the middle plate section 122 also includes a main square portion 136 and a first narrowed projecting portion 138 projecting horizontally to be aligned with portion 132 of the outer plate section 120.

A second narrowed portion 140 also projects downwardly from the main portion 136.

Figure 8:
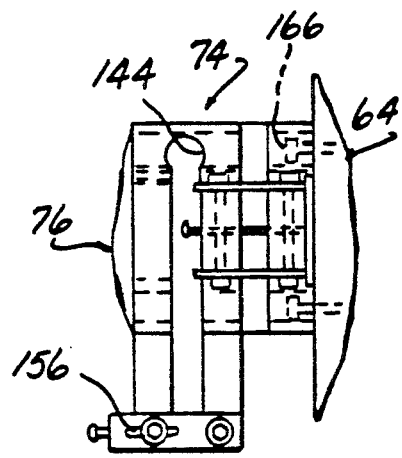
FIG. 8 is a top view of the adjustment flexure shown in FIG. 4.

The outer and the middle plate sections 120, 122 are integrally connected along their sides opposite their narrowed portions 132, 138 with a thin web 142 formed by slot 126. FIG. 8 shows that a drilled opening 144 at the root of the slot 126 produces rounded corners to avoid stress concentrations.

The outboard ends of the narrowed portion 132 is formed with a drilled and tapped hole 146 transverse to the plane of the plate sections 120, 122, which receives an adjustment screw 148 bearing against the surface of the middle plate section 122. Advance or retraction of the adjustment screw 148 thus spreads or returns the plate sections 120, 122 away or towards each other, relatively tilting the plane of each about an axis extending along the web 142.

The narrowed portions 132, 138 are also each formed with tapped holes 150 extending parallel to and entirely through the width of each portion 132, 138 at their outboard ends, aligned with the adjustment screw 148. Pairs of locking screws 152 are oppositely installed from either side of each narrowed portions 132, 138, with a locking strap 154 and lock washers installed beneath each. A slot 156 (FIG. 8) in one side of the strap 152 accommodates adjustments made by rotation of adjustment screw 148, the screws 152 thereafter tightened down to secure the adjustment in a very stable manner not requiring further adjustment for extended periods.

Figure 9:
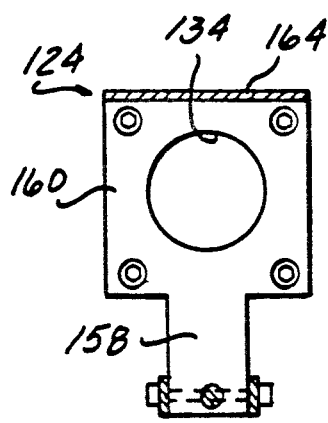
FIG. 9 is a sectional view taken through the adjustment flexure shown in FIG. 4 along the lines 9—9.

FIG. 9 shows that the outer section 124 on the right side as viewed in FIG. 5 is formed with a downwardly projecting portion 158 extending from a main portion 160 aligned with the main portions 130, 136 of the other plate sections 120, 122, the downwardly projecting portion 158 aligned with downwardly projecting portion 140 of the middle section 122. Slot 128 terminates in a drilled opening 162 (FIG. 5), forming a thin web 164 extending orthogonally to web 142, web 164 connecting middle plate section 122 and right outside plate section 124 along one side remote from the projecting portions 140, 158.

An adjusting screw 148 is threaded into a hole in the lower end of the downwardly projecting portion 140 of the middle plate section 122 to bear against the portion 158 of the outside plate section 124. Also locking screws 152, lockwashers, and a slotted strap 154 are provided as for the plate sections 120, 122. Thus, tilting of plate sections 122, 124 may be accomplished about an axis defined by web 164 orthogonal to the axis of tilt comprised by the opposite web 142.

The alignment adjustment flexure 74 thus enables an angular adjustment between two connected optical elements 96, 64 about two orthogonal axes.

The flexure 74 (and attached clamp 76) are fastened to the double splitter housing 64 by a series of screws 166 each installed through 4 counterbored holes 168 machined axially through the corners of the main portion of each plate section 120, 122, 124. The screws 166 each pass within a counterbore section of the holes 168 and seat against the smaller diameter hole at the bottom as shown. A relief of the outside face of plate section 124 creates bosses as shown to insure accurate seating of the flexure 74 against housing 64.

Figure 10:
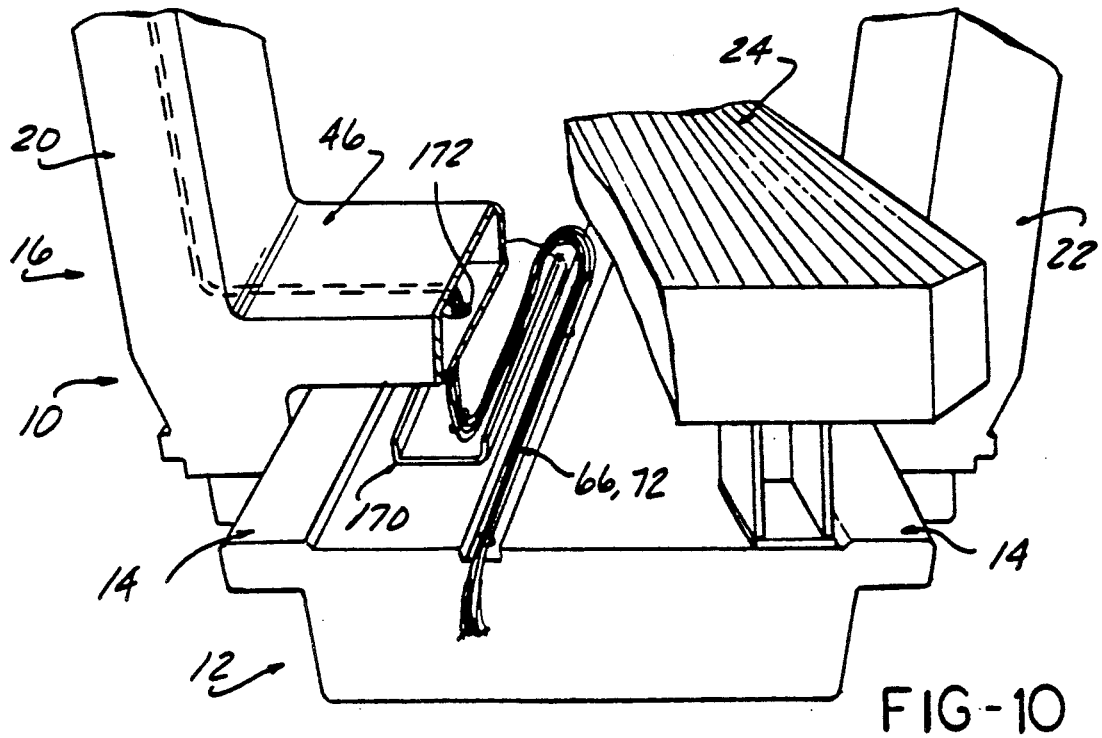
FIG. 10 is a fragmentary front perspective view of the CMM shown in FIG. 1, with the table and Y-axis carriage lower cross beam partially broken away to show the first segment of the fiber optic cable routing.

FIG. 10 shows a first segment of the routing of the optical cables 66, 72 which extend along a central region of the top of the base 12 to the rear of the base 12. From there, cables 66, 72 pass into through slots in the side of a plastic confinement trough 170 fastened to the base 12 alongside the left side ways 14. The optical cables 66, 72 extend forwardly within the trough 170 to a point past the forward position of the X-axis carriage 16 and are looped to the rear as shown. The pair of optical cables 66, 72 then pass up into a hole 172 in the bottom of the hollow lower cross member 46, over to the left leg 20 and thence upwardly within the leg 20.

The loop in the cables 66, 72 accommodates to and fro movement of the Y-axis carriage 16 during measurement.

Figure 11:
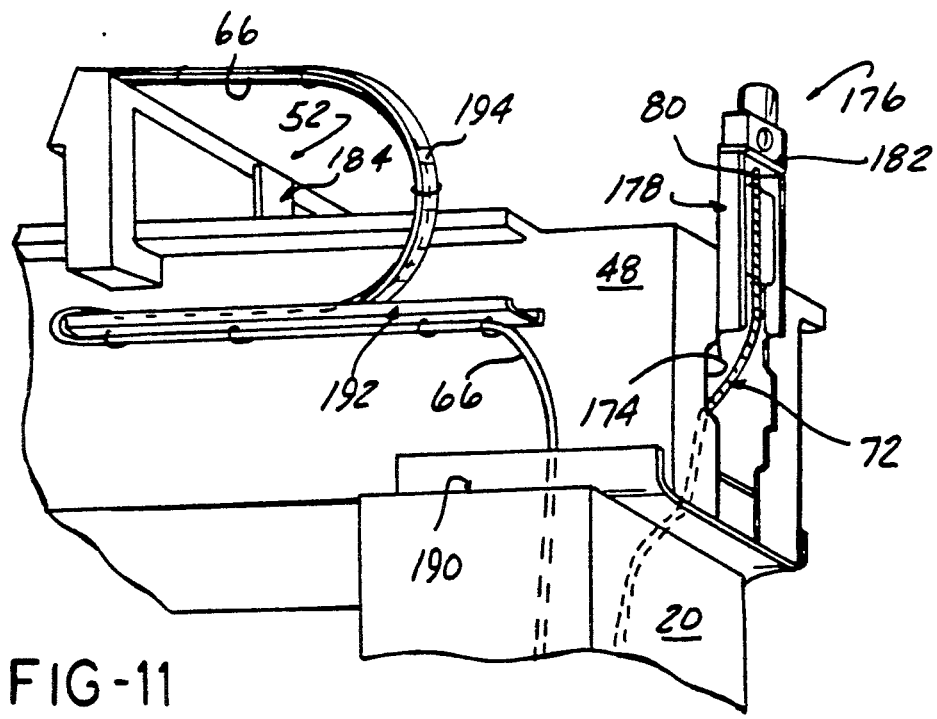
FIG. 11 is a fragmentary perspective view of the rear of the upper corner of the Y-axis carriage, showing the X-axis interferometer and target and a second segment of the routing of the fiber optic cables.

FIG. 11 shows the top of the leg 20 from the rear, in which one optical cable 72 exits out through a gap 174 in the end of the upper cross member 48.

Figure 11A:
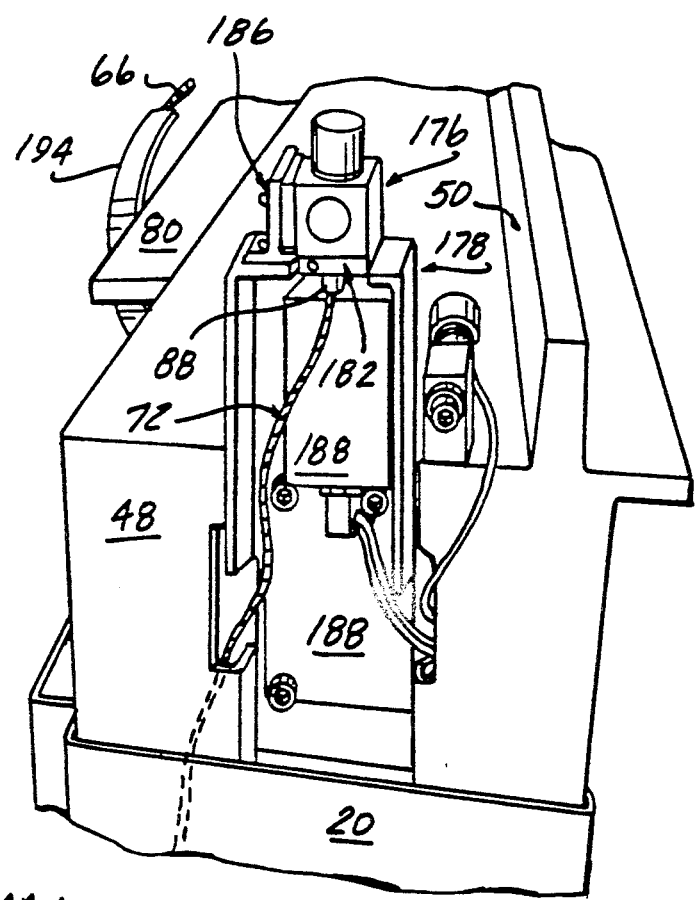
FIG. 11A is an enlarged perspective view of the X-axis interferometer system shown in FIG. 10.

FIG. 11A shows that the cable 72 is installed to an X-axis interferometer 176 mounted to the top of a main bracket 178, coupling 180 clamped by a Simple clamp 182. A target 184 is fixed to the X-axis carriage 52 located to receive the laser beam emanating from the X-axis interferometer 176. The X-axis interferometer 176 is mounted with adjustable bracket 186 of the type described in the above referenced copending U.S. application.

A receiver phase decoder 188 is also mounted to the main bracket 178.

The other optical cable 66 exits on opening 190 (FIG. 11) in the top of leg 20, passes beneath a confinement channel 192 fixed to the rear of the upper cross member 48 around the top thereof and back out towards the outside and loops back resting atop channel 192, towards the X-axis carriage 52. A length of spring steel 194 provides lateral stiffness, to resist flopping over, as the cable 66 extends to the X-axis carriage 52. It is noted that other cables, wires, etc., may be routed with the optical cable 66.

Figure 12:
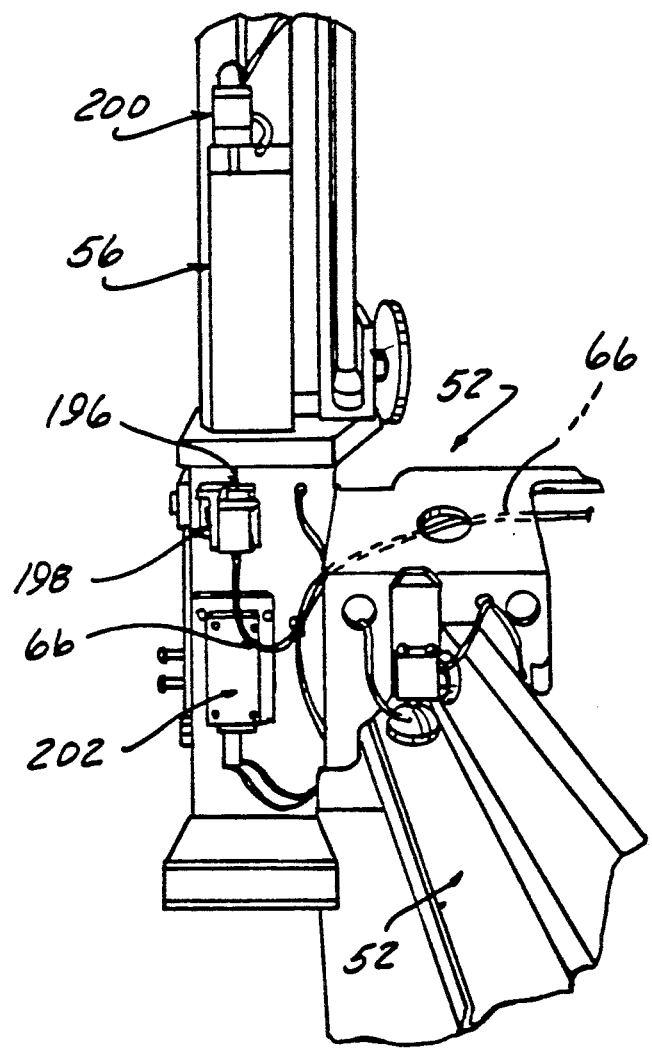
FIG. 12 is a fragmentary rear perspective view of the X-axis carriage, upper cross beam of the Y-axis carriage, and probe, showing the Z-axis interferometer and target and the end segment of the Z-axis fiber optic cable route.

FIG. 12 shows the other side of the X-axis carriage 52, where the optical cable 66 exits and is connected to a Z-axis interferometer 196 mounted (again by an adjustable bracket 198) directly to the carriage 52.

A target 200 is fixed to the probe shaft 56 in alignment with the laser beam emanating from the Z-axis interferometer 196. A receiver-phase decoder 202 is mounted beneath the interferometer 198.

We claim:

1. In combination with a coordinate measuring machine (10) having a table (24) for supporting workpieces to be measured, a probe shaft (56), an X carriage (52), a Y carriage (16) having an upper cross beam (48) extending across and above said table (24), and a base (12), means supporting said Y carriage (16) for movement along a first horizontal axis, means supporting said X carriage (52) on said Y carriage upper cross beam (48) for movement along a second horizontal axis orthogonal to said Y axis, said probe shaft (56) supported on said X carriage (52) for movement along a third axis, a Y axis interferometer (80) mounted on said base (12) and an aligned Y axis retroreflector target mounted on said Y axis carriage (16), an X axis interferometer (176) mounted on said X axis carriage (52), a Z axis interferometer (196) mounted on said X axis carriage (52) combined with an aligned Z axis retroreflector target on said probe shaft (56), a laser beam generator (60) for generating a laser beam and laser beam delivery means for directing said laser beam to each of said X,Y, and Z axis interferometers (80, 176, 196), comprising at least one fiber optic cable (66, 72) comprising at least in part said laser delivery means for delivering said laser beam from said laser generator (60) to one of said interferometers (176, 196);

said beam splitter means (65, 67) includes beam splitter housing means (64) and further including alignment adjustment means (76) for adjustably aligning said at least one fiber optic cable (66, 72) with respect to said housing means (64);

said adjustment means comprising an adjustment flexure having three plate sections (120, 122, 124) generally aligned parallel to each other but spaced apart, to form a stack with two outside plate sections (120, 124) and a middle plate section (122) therebetween; a first web (142) connecting one of said outside plate sections (120) and said middle plate section (122) along adjacent sides thereof; adjustment means (148) for adjustably spreading the other sides of said one and middle plate sections (120, 122) apart, locking means for locking said one and middle plate sections (120, 122) in any adjusted position; a second web (164) connecting the other of said outside plate sections (124) and said middle plate section (122) along adjacent sides thereof extending orthogonally to said first web (142); adjustment means (148) for adjustably spreading said other outside and middle plate sections apart; locking means (152, 154) for locking said other outside and middle plate sections (122, 124) in any adjusted position; mounting means (166, 114) for mounting said one outside plate section (120) to one of said laser generator (60) or said at least one fiber optic cable (66, 72), and said other outside plate section (124) to the other of said laser generator (60) or said at least one fiber optic cable (66, 72) whereby alignment adjustment therebetween about orthogonal axes defined by said first and second webs is enabled.

2. The coordinate measuring machine according to claim 1 wherein each of said plate sections (120, 122, 124) have a rectangular main section (136, 130, 160), one of said outside plate sections (120) having a narrowed portion (132) projecting from said main portion (130) in a first direction normal to said first web (142), the other of said outside plate sections (124) having a narrowed portion (160) projecting from said main portion (158) in a direction normal to said second web (164), said middle plate section (122) formed with two narrowed portions (132, 140) each projecting in the same direction as said narrowed portion (138, 158) on said one and said other plate sections (120, 124) respectively to form facing pairs of narrowed portions (132, 138, 140, 158), and wherein said adjustment means (148) is mounted to each of said respective facing pairs of narrowed portions (132, 138, 140, 158).

3. The coordinate measuring machine according to claim 1 wherein said locking means (152, 154) comprises a strap (154) extending between each adjacent pair of plate sections (120, 122, 124) and screws (152) received in said plate sections (120, 122, 124) extending through said strap (154) to secure the relative position of said plate sections upon tightening of said screws.

4. The coordinate measuring machine according to claim 1 wherein said adjustment means comprises an adjustment screw (148) threaded into one narrowed portion (132, 140) of each facing pair and bearing against the other narrowed portion (138, 158) of each pair to enable spreading of said facing pairs (132, 138, 140, 158) upon advance of said adjustment screw (148).

5. The coordinate measuring machine according to claim 1 further including a clamp (76) fixed to said one outside plate section (120) comprising said mounting means for said at least one fiber optic cable (66, 72).

6. The coordinate measuring machine according to claim 5 wherein said fiber optic cables has a cylindrical fiber optic coupling (96) and wherein said clamps (76) receives said coupling (96) said clamp (76) including a pair of axially spaced jaws (102, 104) partially encircling said fiber optic coupling at respective axially spaced locations on said coupling.

7. In combination, an alignment adjustment flexure for enabling tilting adjustment between mounted optical components (64, 96) comprising:

three plate sections (120, 122, 124) generally aligned parallel to each other but spaced apart, to form a stack with two outside plate sections (120, 124) and a middle plate section (122) therebetween; a first web (142) connecting one of said outside plate sections (120) and said middle plate section (122) along adjacent sides thereof; adjustment means (148) for adjustably spreading the other sides of said one and middle plate sections (120, 122) apart, locking means (152, 154) for locking said one and middle plate sections (120, 122) in any adjusted position; a second web (164) connecting the other of said outside plate sections (124) and said middle plate section (122) along adjacent sides thereof extending orthogonally to said first web (142); adjustment means (148) for adjustably spreading said other outside and middle plate sections apart; locking means (152, 154) for locking said other outside and middle plate sections (122, 124) in any adjusted position; mounting means (166, 114) for mounting said one outside plate section (120) to one of said laser generator (60) or one of said fiber optic cables (66, 72) and said other outside plate section (124) to the other of said laser generator (60) or one fiber optic cables (66, 72) whereby alignment adjustment therebetween about orthogonal axes defined by said first and second webs is enabled.

8. The flexure according to claim 7 where each of said plate sections (120, 122, 124) have a rectangular main section (136, 130, 160), one of said outside plate sections (120) having a narrowed portion (132) projecting from said main portion (130) in a first direction normal to said first web (142), the other of said outside plate sections (124) having a narrowed portion (158) projecting from said main portion (160) in a direction normal to said second web (164), said middle plate section (122) formed with two narrowed portions (132, 140) each projecting in the same direction as said narrowed portion (138, 158) on said one and said other plate sections (120, 124) respectively to form facing pairs of narrowed portions (132, 138, 140, 158), and wherein said adjustment means (148) is mounted to each of said respective facing pairs of narrowed portions (132, 138, 140, 158).

9. The flexure according to claim 7 where said locking means (152, 154) comprises a strap (154) extending between each adjacent pair of plate sections (120, 122, 124) and screws (152) received in said plate sections (120, 122, 124) extending through said strap (154) to secure the relative position of said plate sections upon tightening of said screws.

10. The flexure according to claim 7 where said adjustment means comprises an adjustment screw (148) threaded into one narrowed portion (132, 140) of each facing pair and bearing against other narrowed portion (138, 158) of each pair to enable spreading of said facing pairs (132, 138, 140, 158) upon advance of said adjustment screw (148).

* * * * *